United States Patent [19]

Sloop

[11] Patent Number: 5,230,490
[45] Date of Patent: Jul. 27, 1993

[54] QUICK RELEASE CAMERA MOUNTING MECHANISM

[75] Inventor: Conrad Sloop, Pittsford, N.Y.

[73] Assignee: Saunders Photo/Graphic Inc., Rochester, N.Y.

[21] Appl. No.: 966,327

[22] Filed: Oct. 26, 1992

[51] Int. Cl.⁵ ............................................. F16M 11/04
[52] U.S. Cl. ...................................... 248/187; 354/293
[58] Field of Search ................. 248/187, 223.4, 316.4; 354/76, 126, 293, 295; 358/229

[56] References Cited

U.S. PATENT DOCUMENTS

| | | | |
|---|---|---|---|
| 517,360 | 3/1894 | Perry | 248/187 |
| 2,351,386 | 6/1944 | Zucker | 354/293 X |
| 2,966,107 | 12/1960 | Sanderson | 248/187 X |
| 3,006,052 | 10/1961 | Stickney | 354/293 X |
| 3,029,053 | 4/1962 | Loehnis | 248/187 |
| 3,356,325 | 12/1967 | Schnase | 354/293 X |
| 3,887,289 | 6/1975 | Smart | 354/126 X |
| 4,466,595 | 8/1984 | O'Connor | 248/187 X |
| 4,763,151 | 8/1988 | Klinger | 354/293 |
| 4,929,973 | 5/1990 | Nakatani | 354/293 |
| 4,979,709 | 12/1990 | Ishikawa | 248/187 |

FOREIGN PATENT DOCUMENTS 1123172 9/1956 France ................... 354/293

Primary Examiner—J. Franklin Foss
Attorney, Agent, or Firm—Robert J. Bird

[57] ABSTRACT

A camera mounting and quick release mechanism includes a stationary base plate and cover plate, with a movable cam plate captured between them. The base plate includes a first clamping flange extending upward along one side, a spring-loaded lock pin movable into and out of the base plate, and an actuating spring to urge the cam plate in a clamping position. The base plate and cover plate together support cam pins which extend through the cam plate. The cam plate is movable between a clamping position and a release position, and include cam slots for engagement with the cam pins, a lock aperture for locking engagement with the lock pin when the cam plate is in its release position, and a second clamping flange movable with the cam plate relative to the first clamping flange for releasable engagement with a camera dovetail base.

In another embodiment, a safety lever is rotatable on the base plate between a safety position to prevent release movement of the mechanism, and an open position to permit its release movement. The safety lever is held in its safety position by the actuating spring, and is movable to its open position by manual force opposed to the force on the cam plate release tab.

5 Claims, 2 Drawing Sheets

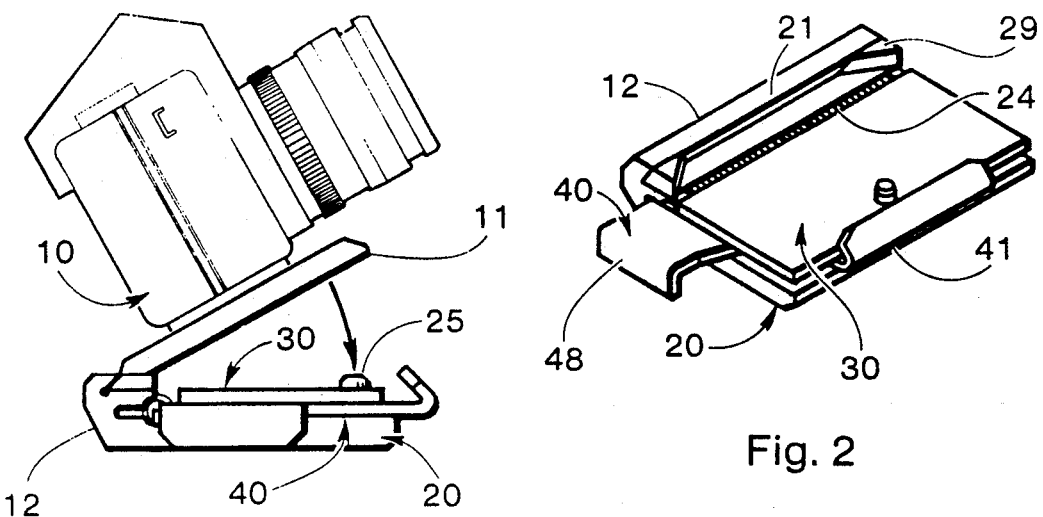
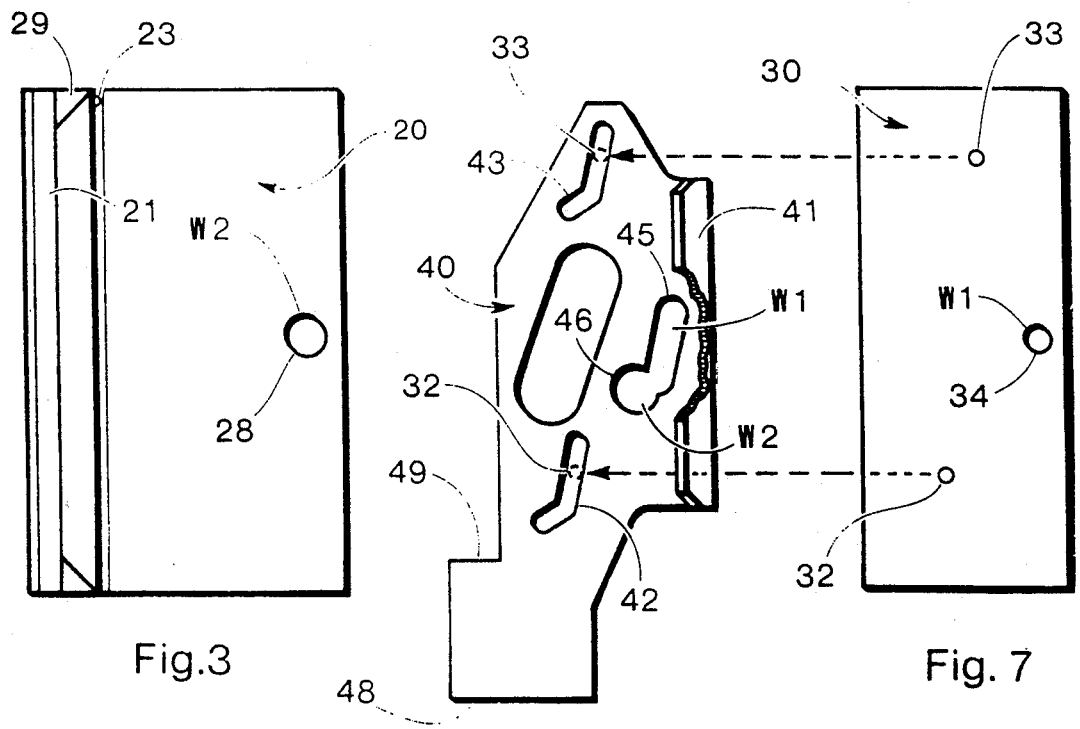
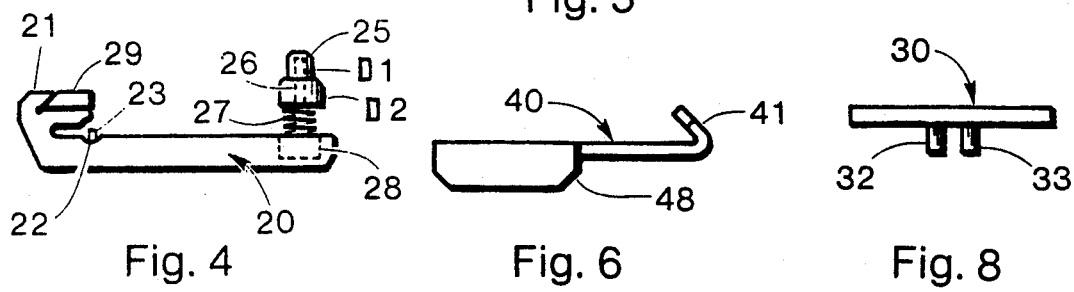

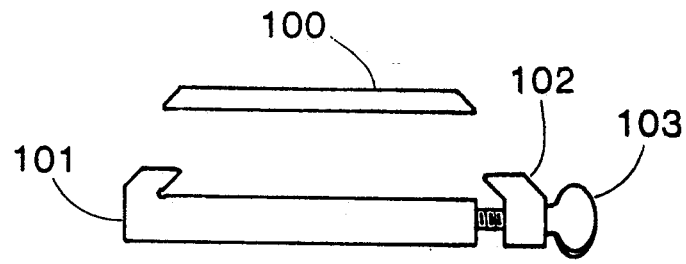
Fig. A (PRIOR ART)
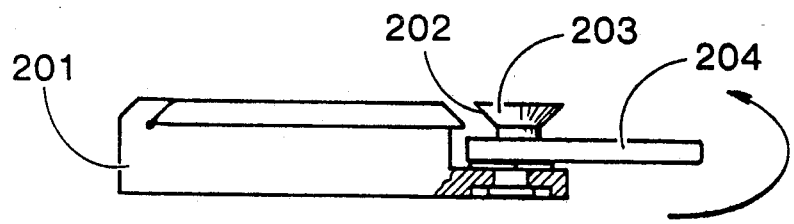
Fig. B (PRIOR ART)
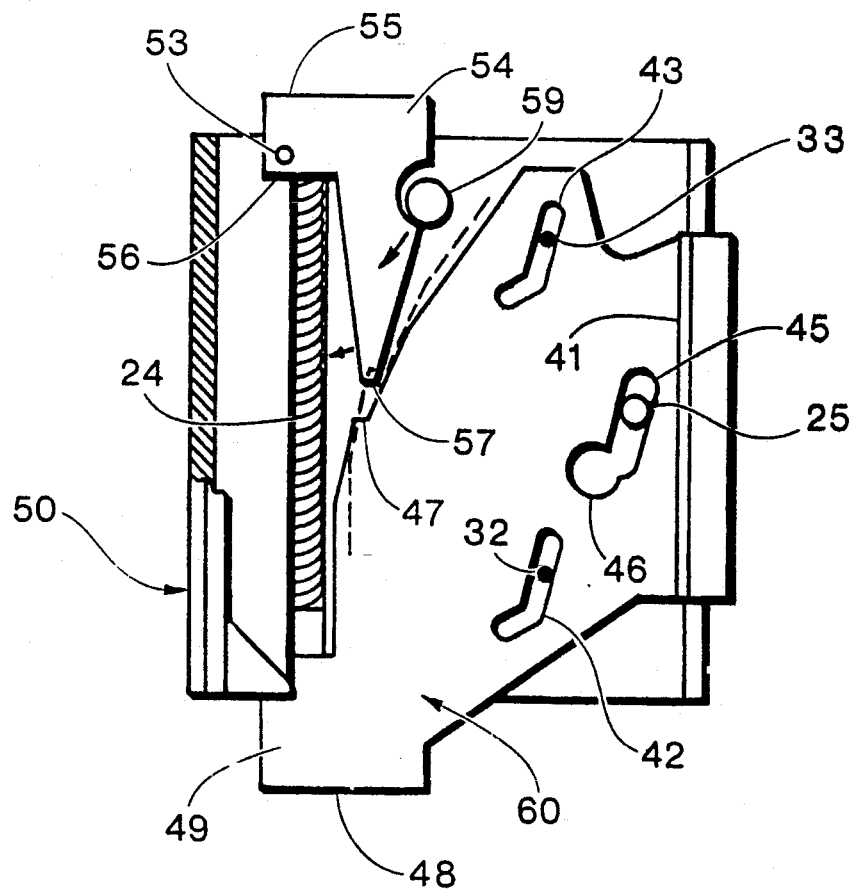
Fig. 9

QUICK RELEASE CAMERA MOUNTING MECHANISM

FIELD OF THE INVENTION

This invention is a quick release mechanism for mounting an instrument, such as a camera, on a support such as a tripod.

BACKGROUND INFORMATION

Devices for releasably mounting a camera on a tripod are known in the prior art. The types that I know of are represented in FIGS. A and B.

The device in FIG. A includes a camera dovetail 100 and a tripod mounting clamp 101. The clamp 101 includes a movable jaw 102 which is closed and opened by a clamp screw 103 to engage and release the camera dovetail. This device requires turning of the clamp screw 103 and is not a quick acting or quick release device.

The device in FIG. B includes a mounting clamp 201 with a movable jaw 202 which is closed and opened by a cam or eccentric 203, rotatable on its vertical axis, actuated by a lever arm 204. This device is relatively quick acting, but requires two hands (or preferably three) to hold the camera, to hold the tripod, and to rotate the lever arm.

It is an object of this invention to provide a camera mounting mechanism which is quick acting, operable by one hand, and substantially less bulky than prior art devices.

SUMMARY OF THE INVENTION

The present invention is a mechanism for releasably mounting a camera on a support. It includes a stationary base plate and cover plate, with a movable cam plate captured between them. The base plate includes a first clamping flange extending upward along one side, a spring-loaded lock pin movable into and out of the base plate, and an actuating spring to urge the cam plate in a clamping position. The base plate and cover plate together support cam pins which extend through the cam plate. The cam plate is movable between a clamping position and a release, and includes cam slots for engagement with the cam pins, a lock aperture for locking engagement with the lock pin when the cam plate is in its release position, a second clamping flange movable with the cam plate relative to the first clamping flange for releasable engagement with a camera dovetail base, and a tab to push the cam plate from clamping position to release position.

In another embodiment, a safety lever is rotatable on the base plate between a safety position to prevent release movement of the mechanism, and an open position to permit its release movement. The safety lever is held in its safety position by the actuating spring, and is movable to its open position by manual force opposed to that on the cam plate release tab.

DRAWING

FIGS. A and B are representative of the prior art, as discussed above.

FIG. 1 a side view of a camera being placed in the quick release mounting mechanism of this invention.

FIG. 2 a three-dimensional view of the mounting mechanism, including base plate, cam plate, and cover plate.

FIGS. 3 and 4 are top and front end views of the base plate.

FIGS. 5 and 6 are top and front end views of the cam plate.

FIGS. 7 and 8 are top and front end views of the cover plate

FIG. 9 is a plan view of a base plate and cam plate in another form of this invention.

DESCRIPTION

In FIG. 1, a camera 10 with a dovetail base 11 is being placed on a mounting mechanism 12 which includes a base plate 20, a cover plate 30, and a cam plate 40. The base plate 20 is mounted on a tripod or other support, not shown, as by screw and thread connection.

FIG. 2 shows the three plates 20, 30, 40 of the mounting mechanism 12 assembled. The base plate 20 and cover plate 30 are fastened to each other and spaced from each other, by suitable fasteners and spacers, not shown. The cam plate 40 is captured between the base plate 20 and the cover plate 30 for movement back and forth along a defined path between an instrument clamping position and an instrument release position.

In FIGS. 3 and 4, the rectangular base plate 20 includes an upward clamping flange 21 extending along one side, and a pair of registration guides 29, one at each end of the plate, to facilitate positioning of the camera base 11. A longitudinal spring slot 22 has an anchor pin 23 at its far end. An actuating compression spring 24 stops against the anchor pin 23. A stepped cylindrical lock pin 25 includes an upper half of diameter D1, a lower half of diameter D2 (larger than D1), and an inner bore 26 to seat a compression spring 27. The lock pin 25 fits in a blind hole 28 of diameter W2 in the base plate 20 for movement between a seated position in the hole and an extended position. The compression spring 27 urges the lock pin 25 outward toward its extended position.

In FIGS. 7 and 8, the rectangular cover plate 30 includes a pair of cam pins 32 and 33 which extend downward from it through the cam plate 40, and a hole 34 of diameter W1 for passage of the upper half of lock pin 25.

In FIGS. 5 and 6, the cam plate 40 is a generally flat plate with an upward clamping flange 41 along one side, opposing the clamping flange 21 on the base plate 20. The cam plate 40 includes a pair of cam slots 42 and 43 and a detent slot 45 of width W1 to receive the upper half D1 of the lock pin 25. The slot 45 includes an end hole 46 of diameter W2 to receive the lower half D2 of the lock pin 25. A release tab 48 extends outward of the mechanism for actuation by finger or thumb to move the cam plate 40 from its clamping position to its release position. The release tab 48 includes a lateral shoulder 49. The actuating spring 24 is in compression between the base plate anchor pin 23 and the cam plate lateral shoulder 49.

FIG. 5 also shows a portion of the base plate 20 and cover plate 30 in phantom, to show the relationships between the cam slots 42, 43, and the cam pins 32, 33, and the lock pin 25. The cam plate 40 is shown in a position, relative to the base plate 20 and cover plate 30, in its nominal clamping position. The cam pins 32 and 33 from cover plate 30 engage the cam slots 42 and 43 respectively.

FIG. 2 shows the cam plate 40 and its flange 41 in clamping position relative to the base plate 20 and its flange 21. The actuating spring 24 in the base plate 20 urges the cam plate 40 toward this position in which the opposed clamping flanges 21 and 41 engage the dovetail base 11 of the camera 10. With the mechanism in clamping position, the cam pins 32, 33 are in positions, relative to the cam plate 40, shown in solid lines in FIG. 5. The lock pin 25 is pushed down in the slot 45 and into the hole 28 of the base plate 20, and its upper portion (dia. D1) engages the detent slot 45.

To open the mechanism from its clamping position to its release position, the mechanism is grasped with the thumb and forefinger of one hand, and the release tab 48 pressed longitudinally in against the actuating spring 24. The angled cam slots 42, 43 in the cam plate 40 react to the stationary cam pins 32, 33 to move the cam plate 40 and the clamping flange 41 laterally away from the flange 21 to release the dovetail 11 and attached instrument. With the mechanism now in its release position, the cam pins 32, 33 are in positions, relative to the cam plate 40, shown in phantom lines in FIG. 5. The end hole 46 in the detent slot 45 is now in line with the hole 28 in the base plate 20, permitting the spring 27 to snap the larger diameter D2 portion of lock pin 25 up into the end hole 46. The portion D2 of the lock pin 25, now seated in the end hole 46, locks the cam plate 40 in its release position. The smaller diameter D1 portion of the lock pin 25 protrudes through the cover plate 30, as best shown in FIG. 1.

From its open, release position, the mechanism is moved into clamping position simply by placing the dovetail camera base 11 into the clamping flange 21 and down onto the protruding lock pin 25 (FIG. 1). This pushes the larger diameter D2 portion of lock pin 25 down, out of the end hole 46 of the detent slot 45 and into the hole 28 in the base plate 20, permitting the actuating spring 24 to snap the cam plate 40 into clamping position. The cam slots 42, 43 and cam pins 32,33 coact to move the cam plate 40 and its clamping flange 41 into position relative to the clamping flange 21 to engage the dovetail base 11. The mechanism is again in clamping position and the cam pins in positions C relative to the cam plate 40.

The cam slots 42, 43 are angled relative to the longitudinal (Y-axis) direction. The angle of these cam slots is smaller in the "clamping" portion (the portion which is active in the clamping position) than in the "release" portion. The smaller cam angle at one end gives the cam plate a mechanical advantage and enhances its clamping strength. The larger cam angle at the other end gives the cam plate a greater lateral displacement per unit of longitudinal displacement to help throw it wide open to its release position. FIG. 9 shows a base plate 50 and cam plate 60 in another form of this invention. The base plate 50 is similar to base plate 20 in FIGS. 3 and 4, with the addition of a safety device to prevent release movement of the mechanism except by deliberate action of opposed manual forces. The device is a safety lever 54, rotatable on a pivot pin 53. The safety lever 54 includes a rear edge 55 for contact by a finger or thumb (in opposition to the thumb or finger pressing against the release tab 48), a spring seat 56 to receive one end of the actuating spring 24, and a stop 57. The safety lever 54 is rotatable through a small arc, as indicated, between a closed or safety position and an open position. The safety lever 54 straddles a screw 59 which is one of the fasteners connecting the base plate 50 to its cover plate. The safety lever 54 thus moves through an arc defined by the clearance between the safety lever 54 and the screw 59. The cam plate 60 in FIG. 9 is essentially the same as cam plate 40 in FIG. 5, with the additional provision of a stop shoulder 47.

In the clamping position of the mechanism, as shown, the stop 57 of the safety lever 54 is in the way of the stop shoulder 47 of the cam plate 40, and will prevent any movement of the cam plate caused or attempted by actuation of only the release tab 48. The actuating spring 24 holds the safety lever 54 in this position. To actuate the mechanism, and move it into its release position, it is necessary to grasp both ends of the mechanism with opposing thumb and fingers, and to press in on the opposing members (release tab 48 and safety lever rear edge 55). The force on the rear edge 55 rotates the safety lever 54 slightly, moving the stop 57 out of the way of the stop shoulder 47 and freeing the cam plate 40 to move to its release position. In the return operation, when the mechanism moves from the release to the clamping position, the safety lever resets itself. All the rest of the operation of the mechanism is as described above in connection with FIGS. 1-8.

Certain details, such as the fasteners required to secured the cover plate to the base plate, are omitted from this description and from the drawing. They are not germane to the invention and they would, if they were shown, obscure the essential details of the invention.

The foregoing description of preferred embodiments of this invention, including any dimensions, angles or proportions, is intended as illustrative. The concept and scope of the invention are limited only by the following claims and equivalents thereof.

What is claimed is:

1. A mechanism for releasably mounting an instrument on a support, said mechanism including a base plate and a cam plate;

said base plate adapted for connection to said support and including a first clamping flange extending upward along one side thereof, a lock pin movable into and out of said base plate, and an actuating spring biased against said cam plate to urge said cam plate in a clamping position, said base plate supporting a cam pin extending through said cam plate;

said cam plate being movable on said base plate between a clamping position and a release position, and including a cam slot for engagement with said cam pin, a lock aperture for locking engagement with said lock pin when said cam plate is in said release position, and a second clamping flange movable with said cam plate toward and away from said first clamping flange for releasable engagement with said instrument.

2. A mechanism as defined in claim 1, further including a release tab by which to move said cam plate from said clamping position to said release position.

3. A mechanism as defined in claim 2, further including:

a safety lever rotatable on said base plate between a safety position blocking the path of said cam plate to prevent release movement of said mechanism, and an open position to permit said release movement, said safety lever being held in said safety position by said actuating spring, and being movable to the open position thereof by manual actuation in opposition to the actuation of said release tab of said cam plate.

4. A mechanism for releasably mounting an instrument on a support, said mechanism including a base plate and a cover plate secured to each other, and a cam plate captured therebetween and movable relative thereto;

said base plate adapted for connection to said support and including a first clamping flange extending upward along one side thereof, a springloaded lock pin movable into and out of said base plate, and an actuating spring biased against said cam plate to urge said cam plate in a clamping position;

said base plate and said cover plate together supporting a plurality of cam pins extending through said cam plate;

said cam plate being movable between a clamping position and a release position, and including a cam slot for engagement with each of said cam pins, a lock aperture for locking engagement with said lock pin when said cam plate is in said release position, a second clamping flange movable with said cam plate toward and away from said first clamping flange for releasable engagement with said instrument, and a manual tab by which to move said cam plate from said clamping position to said release position.

5. A mechanism as defined in claim 4, further including:

a safety lever rotatable on said base plate between a safety position blocking the path of said cam plate to prevent release movement of said mechanism, and an open position to permit said release movement, said safety lever being held in said position by said actuating spring, and being movable to the open position thereof by manual actuation in opposition to the actuation of said release tab of said cam plate.

* * * * *